(12) United States Patent
Aoki

(10) Patent No.: US 9,538,393 B2
(45) Date of Patent: Jan. 3, 2017

(54) MOBILE TERMINAL TEST APPARATUS AND MOBILE TERMINAL TEST METHOD

(71) Applicant: ANRITSU CORPORATION, Kanagawa (JP)

(72) Inventor: Kazunori Aoki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 571 days.

(21) Appl. No.: 14/029,923

(22) Filed: Sep. 18, 2013

(65) Prior Publication Data

US 2014/0092750 A1 Apr. 3, 2014

(30) Foreign Application Priority Data

Oct. 1, 2012 (JP) .................. 2012-219512

(51) Int. Cl.
*H04W 24/00* (2009.01)
*H04W 24/06* (2009.01)
*G06F 15/173* (2006.01)

(52) U.S. Cl.
CPC ............. *H04W 24/00* (2013.01); *H04W 24/06* (2013.01)

(58) Field of Classification Search
CPC G06F 3/04842; G06F 3/0482; G06F 19/3406; G06F 3/0484; H04L 41/0813; H04L 41/0803
See application file for complete search history.

(56) References Cited

U.S. PATENT DOCUMENTS

| 7,190,978 B2 * | 3/2007 | Saikyo | H04W 24/06 455/423 |
| 2005/0114500 A1 * | 5/2005 | Monk | H04L 12/2602 709/224 |
| 2011/0149332 A1 * | 6/2011 | Cho | G06F 21/608 358/1.14 |
| 2011/0205065 A1 * | 8/2011 | Strachan | A61B 5/14532 340/573.1 |

FOREIGN PATENT DOCUMENTS

JP 2003046431 2/2003

* cited by examiner

*Primary Examiner* — Mohamed Kamara
*Assistant Examiner* — Will Lin
(74) *Attorney, Agent, or Firm* — Pearne & Gordon LLP

(57) ABSTRACT

To provide a mobile terminal test apparatus and a mobile terminal test method capable of setting the setting items more easily and more accurately than in the related art and testing mobile terminals. A mobile terminal test apparatus 10 includes a registered item display screen control unit 32 that performs a display control operation of displaying a registered item display screen including registered items, a history display screen control unit 33 that performs a display control operation of displaying a history display screen for displaying the history of the setting items set in the past and test parameter values, and a setting item display processing unit 35 that performs at least one of a process related to the display order of the setting items and a process related to the deletion of the setting items.

20 Claims, 11 Drawing Sheets

| Communication standard | Large category | Small category | Setting item |
|---|---|---|---|
| LTE | Commom | – | Call Processing |
| | | – | Scenario |
| | | Frequency | Frame Structure |
| | | | Channel Bandwidth |
| | | | UL Channel |
| | | | DL Channel |
| | | | Operation Band |
| | Physical Channel | – | xxxx |
| | ⋮ | ⋮ | ⋮ |
| W-CDMA | Commom | – | Call Processing |
| | | ⋮ | ⋮ |
| | ⋮ | ⋮ | ⋮ |

FIG. 3

MOBILE TERMINAL TEST APPARATUS AND MOBILE TERMINAL TEST METHOD

TECHNICAL FIELD

The present invention relates to a mobile terminal test apparatus and a mobile terminal test method for testing a mobile terminal.

BACKGROUND ART

In recent years, as this type of apparatus, a mobile terminal transmission power measurement device disclosed in Patent Document 1 has been known.

The mobile terminal transmission power measurement device disclosed in Patent Document 1 includes setting means for setting the number of changes in transmission power and a variation in transmission power corresponding to a transmission request to a mobile terminal, request means for requesting the mobile terminal to transmit the number of changes in transmission power and the variation in transmission power, slot detecting means for detecting the slot of the mobile terminal on the basis of the transmission power transmitted from the mobile terminal, and slot power detecting means for detecting a variation in the power of each slot or the power between the slots.

According to this structure, the mobile terminal transmission power measurement device disclosed in Patent Document 1 compares the detection result of the slot power detecting means with the setting information of the setting means to check the operation of the mobile terminal.

RELATED ART DOCUMENT

Patent Document

[Patent Document 1] Japanese Patent No. 3708458

DISCLOSURE OF THE INVENTION

Problem that the Invention is to Solve

However, in the manufacturing line of this type of mobile terminal, when testing the operation of the mobile terminal, the tester needs to set items (hereinafter, referred to as "setting items") which are set to perform various tests to the mobile terminal test apparatus. In particular, in recent years, a mobile terminal capable of using a plurality of communication standards has been developed. In addition, the number of types of setting items has increased and the number of similar setting items has increased.

However, the mobile terminal test apparatus according to the related art only displays the setting items on the screen. Therefore, it takes a long period of time for the tester to search for a desired setting item or there is a concern that the tester will select a setting item similar to a desired setting item and perform a wrong test.

The invention has been made in view of the above-mentioned problems and an object of the invention is to provide a mobile terminal test apparatus and a mobile terminal test method capable of setting the setting items more easily and more accurately than in the related art and testing mobile terminals.

Means for Solving the Problem

According to a first aspect of the invention, there is provided a mobile terminal test apparatus (10) that outputs a predetermined test signal to a mobile terminal (1) to test the mobile terminal. The mobile terminal test apparatus includes all-setting-item storage means (41) for storing all setting items which can be set and are used to test the mobile terminal, all-setting-item display means (31) for displaying the all setting items stored in the all-setting-item storage means, test execution means (51) for performing a test related to the setting item which is selected by a tester among the setting items displayed by the all-setting-item display means, specific item display means (32, 33) for displaying a specific setting item among the all setting items, and setting item display processing means (35) for performing a process related to a display order of the setting items displayed by the specific item display means, a process related to the deletion of the setting items displayed by the specific item display means, or a combination thereof, in response to an instruction from the tester. The test execution means performs a test related to the setting item which is selected by the tester among the setting items displayed by the specific item display means.

According to this structure, in the mobile terminal test apparatus according to the first aspect of the invention, the setting item display processing means performs at least one of the process related to the display order of the setting items displayed by the specific item display means and the process related to the deletion of the setting items in response to the instruction from the tester. Therefore, the display of the setting items is customized to display corresponding to the preference of the tester.

Therefore, the tester can select and set the setting items more easily and more accurately than in the structure in which the setting items are simply arranged and the possibility that a setting error will occur is reduced. Therefore, the mobile terminal test apparatus according to the first aspect of the invention can set the setting items more easily and more accurately than in the related art and test mobile terminals.

The setting item display processing means may rearrange the display order of the setting items displayed by the specific item display means on the basis of the frequency of use of the setting items which have been used in the past by the tester.

The setting item display processing means may rearrange the display order of the setting items displayed by the specific item display means on the basis of a selection time indicating a time when the setting item which has been used in the past by the tester has been selected.

The setting item display processing means may rearrange the display order of the setting items displayed by the specific item display means for each predetermined setting item group.

The setting item display processing means may delete the setting item designated by the tester among the setting items displayed by the specific item display means.

The all-setting-item storage means may hierarchically store the setting items. The mobile terminal test apparatus may further include hierarchical information display means (34) for displaying hierarchical information indicating a hierarchical structure of the selected setting item on the basis of the content of the setting items stored in the all-setting-item storage means, on condition that the setting item displayed by the specific item display means is selected.

According to this structure, in the mobile terminal test apparatus, the hierarchical information display means displays the hierarchical information on condition that the setting item displayed by the specific item display means is selected. Therefore, the possibility that a setting error will occur is reduced and it is possible to set the setting items more easily and more accurately than in the related art and test the mobile terminal.

The mobile terminal test apparatus may further include history storage means (43) for storing a history of the setting item which has been set in the past. The specific item display means may display the setting item stored in the history storage means.

The mobile terminal test apparatus may further include registered item storage means (42) for storing a setting item registered by the tester. The specific item display means may display the setting item stored in the registered item storage means.

The all-setting-item display means, the specific item display means, and the setting item display processing means may be formed by a computer including a CPU and a RAM and a program executed by the computer.

According to a tenth aspect of the invention, there is provided a mobile terminal test method that tests a mobile terminal using a mobile terminal test apparatus (10) which outputs a predetermined test signal to the mobile terminal (1) to test the mobile terminal. The mobile terminal test method includes an all-setting-item display step (S12) of displaying all setting items which can be set and are used to test the mobile terminal, a test execution step (S15) of performing a test related to the setting item which is selected by a tester among the setting items displayed in the all-setting-item display step, a specific item display step (S21, S31) of displaying a specific setting item among the all setting items, and a setting item display processing step (S23, S33) of performing a process related to a display order of the setting items displayed in the specific item display step, a process related to the deletion of the setting items displayed in the specific item display step, or a combination thereof, in response to an instruction from the tester. The test execution step (S15) performs a test related to the setting item which is selected by the tester among the setting items displayed in the specific item display step.

According to this structure, in the mobile terminal test method according to the tenth aspect of the invention, the setting item display processing step performs at least one of the process related to the display order of the setting items displayed in the specific item display step and the process related to the deletion of the setting items displayed in the specific item display step in response to the instruction from the tester. Therefore, the display of the setting items is customized to display corresponding to the preference of the tester.

Therefore, the tester can select and set the setting items more easily and more accurately than in the structure in which the setting items are simply arranged and the possibility that a setting error will occur is reduced. Therefore, the mobile terminal test method according to the tenth aspect of the invention can set the setting items more easily and more accurately than in the related art and test mobile terminals.

The same structure as that which can be added to the mobile terminal test apparatus according to the first aspect of the invention can be added to the mobile terminal test method according to the tenth aspect of the invention.

Advantage of the Invention

According to the invention, it is possible to provide a mobile terminal test apparatus and a mobile terminal test method capable of setting the setting items more easily and more accurately than in the related art and testing mobile terminals.

BRIEF DESCRIPTION OF THE DRAWINGS

FIG. 3 is a diagram illustrating an example of setting items stored in an all-setting-item storage unit of the mobile terminal test apparatus according to the embodiment of the invention.

BEST MODE FOR CARRYING OUT THE INVENTION

Hereinafter, embodiments of the invention will be described with reference to the drawings.

First, the structure of a mobile terminal test apparatus according to an embodiment of the invention will be described with reference to FIGS. 1 to 3.

Figure 1:
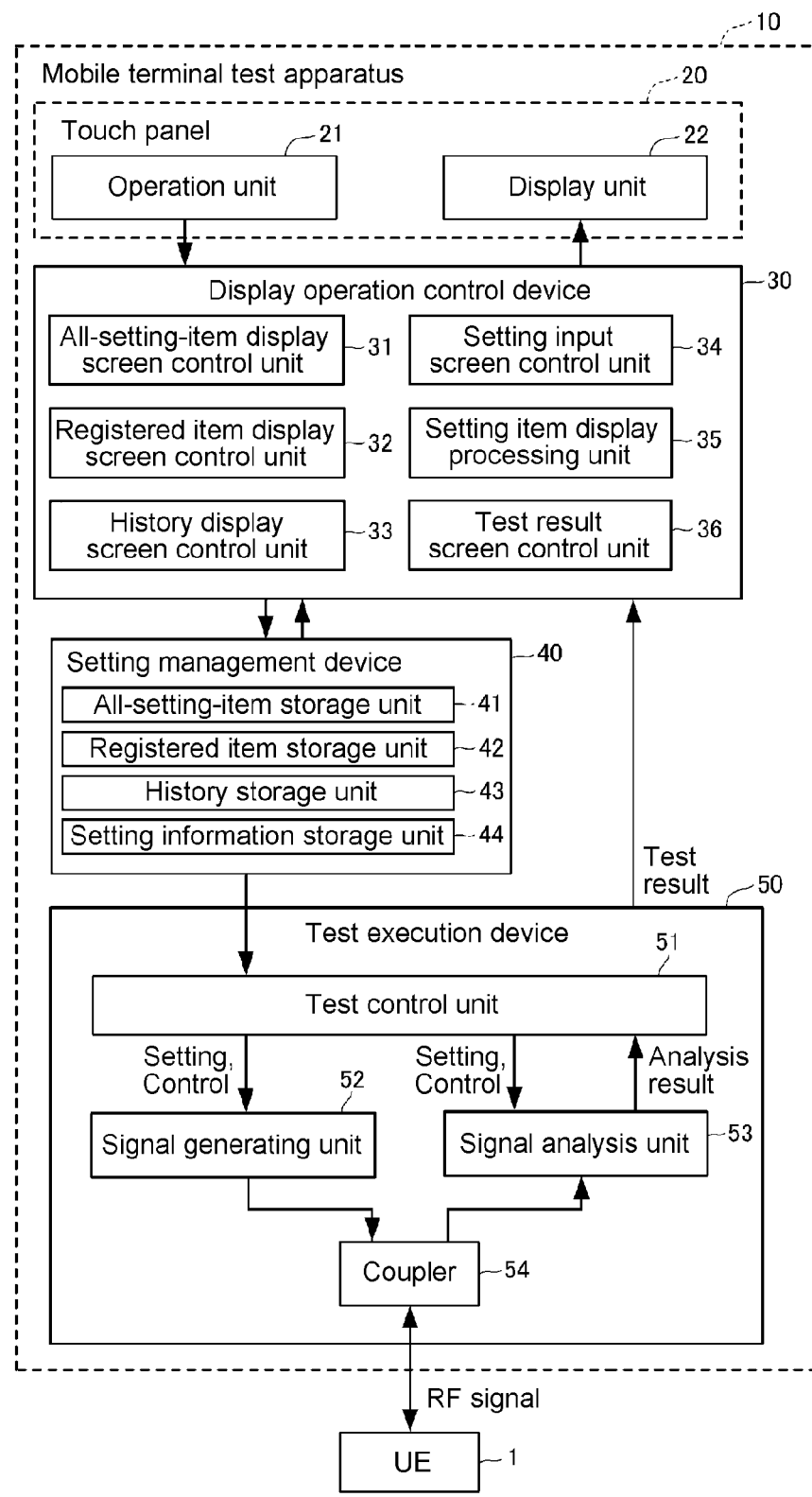
FIG. 1 is a block diagram illustrating a mobile terminal test apparatus according to an embodiment of the invention.

As shown in FIG. 1, a mobile terminal test apparatus 10 according to this embodiment tests user equipment (UE: for example, a mobile terminal) 1 and includes a touch panel 20, a display operation control device 30, a setting management device 40, and a test execution device 50.

The mobile terminal test apparatus 10 includes a microcomputer (not shown) including, for example, a central processing unit (CPU), a read only memory (ROM), a random access memory (RAM), and an input/output circuit connected to various interfaces. The mobile terminal test apparatus 10 executes a control program which is stored in the ROM in advance to make the microcomputer function as functional units such as the touch panel 20, the display operation control device 30, the setting management device 40, and the test execution device 50.

The touch panel 20 includes an operation unit 21 which outputs an operation signal in response to a touch operation of the tester and a display unit 22 which is a liquid crystal display and is arranged so as to overlap the operation unit 21. When the touch operation is detected, the operation unit 21 outputs an operation signal indicating an operation position to the display operation control device 30. The display unit 22 displays a predetermined screen on the basis of a display control signal from the display operation control device 30.

The operation of touching the touch panel 20 includes, for example, the operation of the tester touching (hereinafter, referred to as "tapping") the screen a predetermined number of times with a finger and an operation of sliding the finger on the screen.

Figure 2:
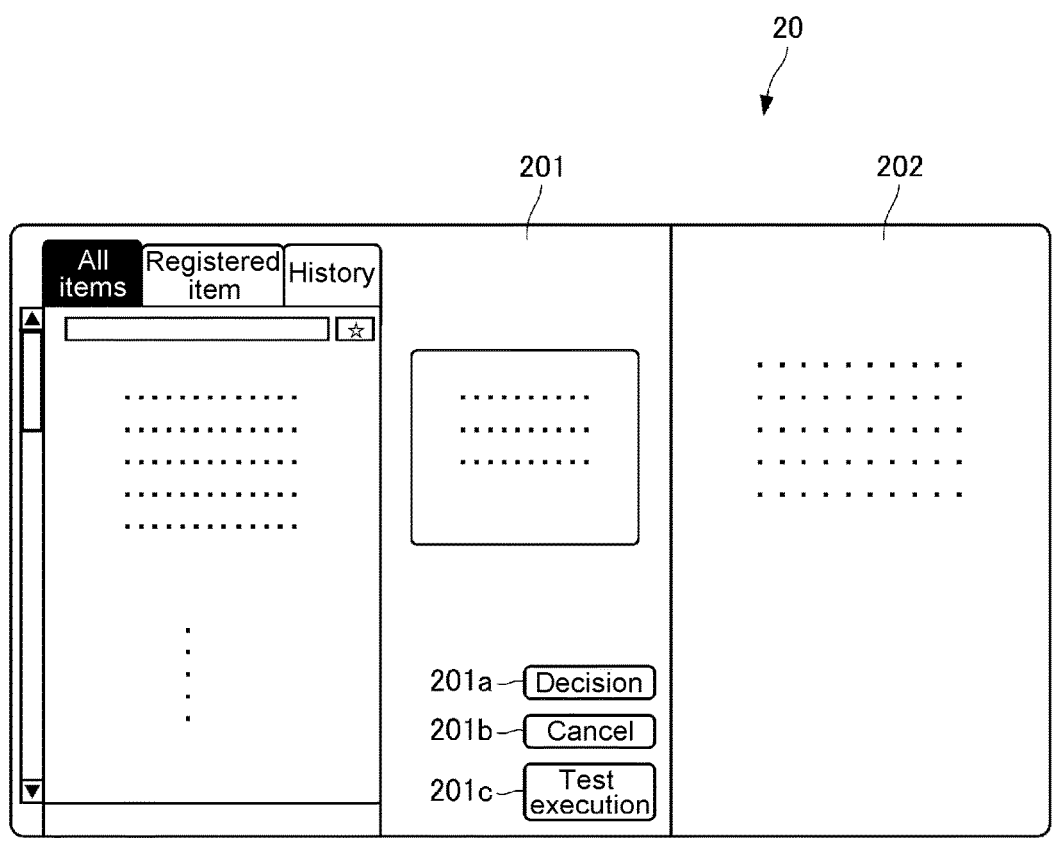
FIG. 2 is a diagram illustrating the outward appearance of a touch panel in the mobile terminal test apparatus according to the embodiment of the invention.

The touch panel 20 has, for example, the outward appearance shown in FIG. 2. In FIG. 2, the touch panel 20 includes a setting item setting area 201 in which one or more windows for setting the setting items are displayed and a test result display area 202 in which the test result is displayed. A decision button 201a for deciding the setting items or the set content of test values (hereinafter, referred to as "test parameter values") determined for each setting item, a cancel button 201b for cancelling the set content, and a test execution button 201c for performing the test with the set setting items and test parameter values are displayed in the setting item setting area 201.

The display operation control device 30 controls the operation of displaying a predetermined display screen on the touch panel 20 or the touch operation and includes an all-setting-item display screen control unit 31, a registered item display screen control unit 32, a history display screen control unit 33, a setting input screen control unit 34, a setting item display processing unit 35, and a test result screen control unit 36.

The all-setting-item display screen control unit 31 performs a display control operation of acquiring data for setting items in all tests which can be performed by the mobile terminal test apparatus 10 from the setting management device 40 and displaying an all-setting-item display screen including all setting items in the setting item setting area 201. The all-setting-item display screen control unit 31 forms all-setting-item display means according to the invention. An all-setting-item storage unit 41 of the setting management device 40 hierarchically stores all setting items, which will be described below.

The registered item display screen control unit 32 performs a display control operation of displaying a registered item display screen including the registered items which have been registered in the past by the tester in the setting item setting area 201. The registered item display screen control unit 32 forms registered item display means and specific item display means according to the invention.

The history display screen control unit 33 performs a display control operation of displaying a history display screen for displaying the history of the test parameter values and the setting items which have been set in the past in the setting item setting area 201. The history display screen control unit 33 forms history display means and specific item display means according to the invention.

The setting input screen control unit 34 controls the display of screens for inputting the setting items and the test parameter values (hereinafter, the setting items and the test parameter values are generically referred to as "setting information"). In addition, the setting input screen control unit 34 displays information indicating the hierarchical structure of the setting items (hereinafter, referred to as "hierarchical information") in the setting item setting area 201. The setting input screen control unit 34 forms hierarchical information display means according to the invention.

The setting item display processing unit 35 performs at least one of a process related to the display order of the setting items displayed in the registered item display screen and the history display screen and a process related to the deletion of the setting items in response to instructions from the tester. The setting item display processing unit 35 forms setting item display processing means according to the invention.

The test result screen control unit 36 performs a display control operation of receiving data for the test result from the test execution device 50 and displaying the data in the test result display area 202.

The setting management device 40 includes an all-setting-item storage unit 41 which stores data for the setting items in all tests which can be performed by the mobile terminal test apparatus 10, a registered item storage unit 42 which stores data for the registered items which have been registered in the past by the tester, a history storage unit 43 that stores data for the history of the setting items which have been set in the past by the tester, and a setting information storage unit 44 which stores data for the setting information set by the tester before a test.

FIG. 3 shows an example of the setting items stored in the all-setting-item storage unit 41. As shown in FIG. 3, the all-setting-item storage unit 41 hierarchically stores data for the setting items which are set for each of a large category and a small category in advance for each communication standard. For example, the all-setting-item storage unit 41 stores "Frame Structure", "Channel Bandwidth", "UL Channel: uplink channel", "DL Channel: downlink channel", and "Operation Band: operating frequency band" as the setting items in the lowest layer of a small category "Frequency" belonging to a large category "Common" which is an upper layer in a communication standard Long Term Evolution (LTE). The all-setting-item storage unit 41 may store, for example, the test parameter values which are determined during factory shipment for each setting item. The all-setting-item storage unit 41 forms all-setting-item storage means according to the invention.

For example, when the tester registers the setting item "Frame Structure" which is the lower layer of the small category "Frequency" belonging to the large category "Common" in the communication standard LTE, the registered item storage unit 42 stores the setting item "Frame Structure" so as to be associated with the communication standard LTE, the large category "Common", and the small category "Frequency" which are hierarchical information.

Similarly to the above description, for example, when the tester selects "Frame Structure" as the setting item, the history storage unit 43 stores the setting item "Frame Structure" so as to be associated with the hierarchical information thereof.

The setting information storage unit 44 acquires the setting information which has been set by the tester before a test from the setting input screen control unit 34 of the display operation control device 30 and stores the acquired setting information.

The test execution device 50 includes a test control unit 51 which controls the execution of the test related to the setting items, a signal generating unit 52 which generates a radio frequency (RF) test signal to be transmitted to UE1, a signal analysis unit 53 which analyzes a response signal from UE1, and a coupler 54 which is coupled to UE1 through, for example, a coaxial cable. The test control unit 51 forms test execution means according to the invention.

Figure 4:
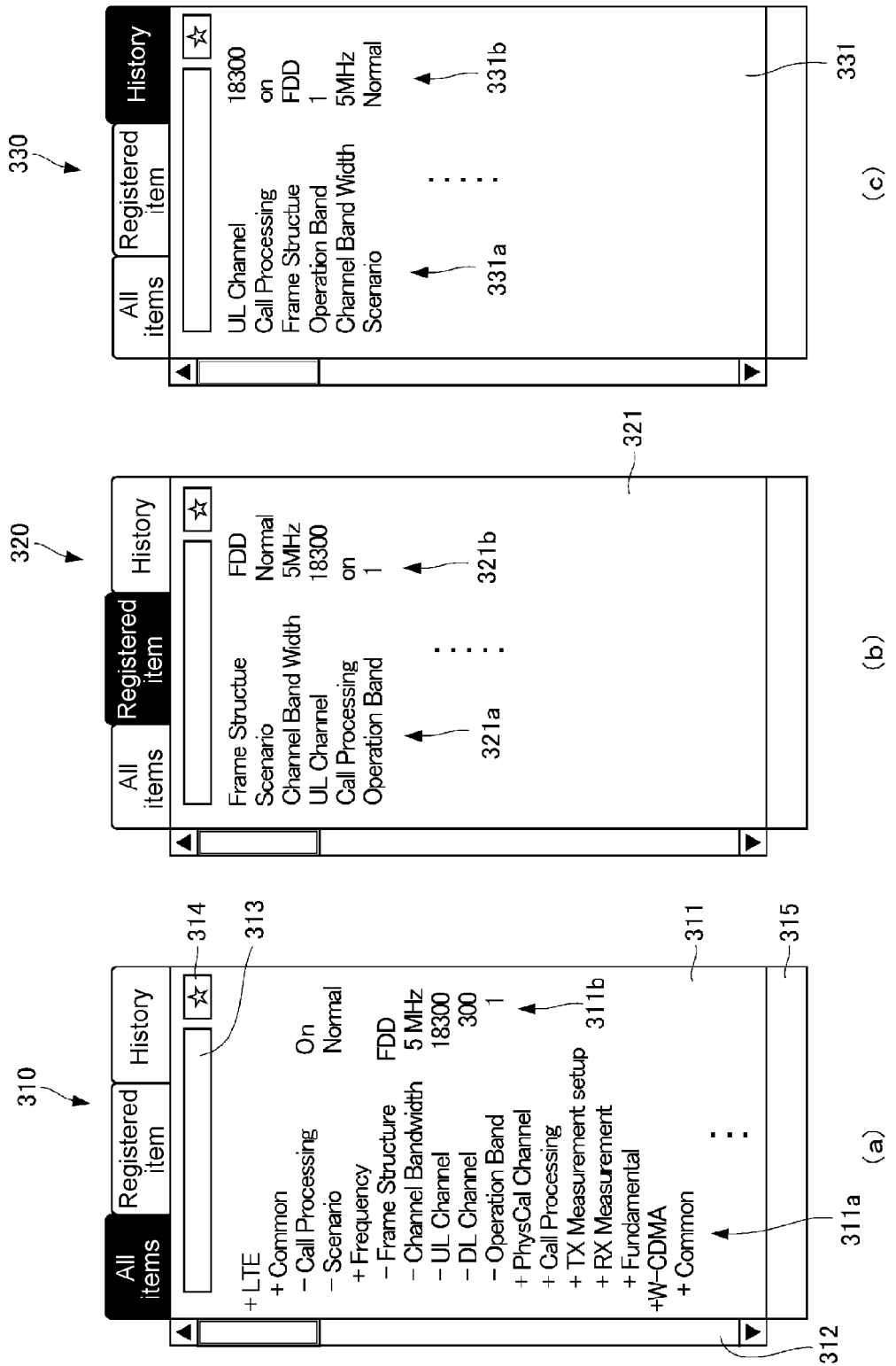
FIG. 4 is a diagram illustrating examples of screens displayed by an all-setting-item display screen control unit, a registered item display screen control unit, and a history display screen control unit of the mobile terminal test apparatus according to the embodiment of the invention.

Next, examples of the screens which are displayed in the setting item setting area 201 (see FIG. 2) by the all-setting-item display screen control unit 31, the registered item display screen control unit 32, and the history display screen control unit 33 in the display operation control device 30 will be described with reference to FIG. 4.

FIG. 4(a) shows an example of the display of an all-setting-item display screen 310 which is displayed by the all-setting-item display screen control unit 31. As shown in FIG. 4(a), the all-setting-item display screen 310 is displayed when the tester taps an all-item tab of the window and includes an all-item display area 311 in which all setting items are displayed in a tree structure for each layer, a scroll bar 312 which scrolls the setting items in the vertical direction, an input box 313 which inputs a search key for searching for the setting item, a registration button 314 which is tapped by the tester to register the setting item, and a hierarchical information display screen 315 which displays hierarchical information. The all-item display area 311 includes a setting item display field 311a in which the setting items are displayed and a test parameter value display field 311b in which test parameter values, such as predetermined values or the previously set values, are displayed.

FIG. 4(b) shows an example of the display of the registered item display screen 320 which is displayed by the registered item display screen control unit 32. As shown in FIG. 4(b), the registered item display screen 320 is displayed when the tester taps the registered item tab of the window and includes a registered item display area 321 in which the setting items and the test parameter values registered by the tester are displayed in the reverse chronological order of registration. The registered item display area 321 includes a setting item display field 321a in which the setting items are displayed and a test parameter value display field 321b in which the test parameter values are displayed.

The setting item registered in the registered item display screen 320 is similar to a so-called "favorite" or "bookmark" in a web browser which displays the screen in order to browse a web page using, for example, the Internet. However, the setting item greatly differs from the "favorite" or "bookmark" in the following points.

That is, among the setting items registered in the registered item display screen 320, many setting items are very similar to each other and are easily confusable in order to test the operation of UE1. However, since the similar and confusing setting items are limited and can be checked by the mobile terminal test apparatus 10 (that is, the similar and confusing setting items are stored in the all-setting-item storage unit 41 in advance), it is easy for the mobile terminal test apparatus 10 to manage the setting items registered by the tester. In contrast, the web browser cannot check the item which is registered as "favorite" by the user. In addition, in the web browser, since the item which is registered as "favorite" is displayed so as not to be confusing, the user is less likely to select the registration information by mistake.

Reference numerals denoting the same components as those of the all-setting-item display screen 310 are not shown. In FIG. 4(b), for example, "Frame Structure" is registered together with "Frequency Division Duplex (FDD)" as the test parameter value. However, for example, when "Time Division Duplex (TDD)" is registered in addition to "FDD", the two items are displayed in the registered item display area 321. In the example shown in FIG. 4(b), both the setting item display field 321a and the test parameter value display field 321b are displayed. However, only the setting item display field 321a may be displayed.

FIG. 4(c) shows an example of the display of the history display screen 330 which is displayed by the history display screen control unit 33. As shown in FIG. 4(c), the history display screen 330 is displayed when the tester taps the history tab of the window and includes a history display area 331 in which the test parameter values and the setting items set by the tester are displayed with, for example, the history of the order of the frequency of use. The history display area 331 includes a setting item display field 331a in which the setting items are displayed and a test parameter value display field 331b in which the test parameter values are displayed.

Reference numerals denoting the same components as those of the all-setting-item display screen 310 are not shown. In the example shown in FIG. 4(c), both the setting item display field 331a and the test parameter value display field 331b are displayed. However, only the setting item display field 331a may be displayed.

Next, the operation of the display operation control device 30 controlling the display of each screen will be described.

First, the operation of the display operation control device 30 controlling the display of the all-setting-item display screen 310 will be described with reference to FIG. 5.

Figure 5:
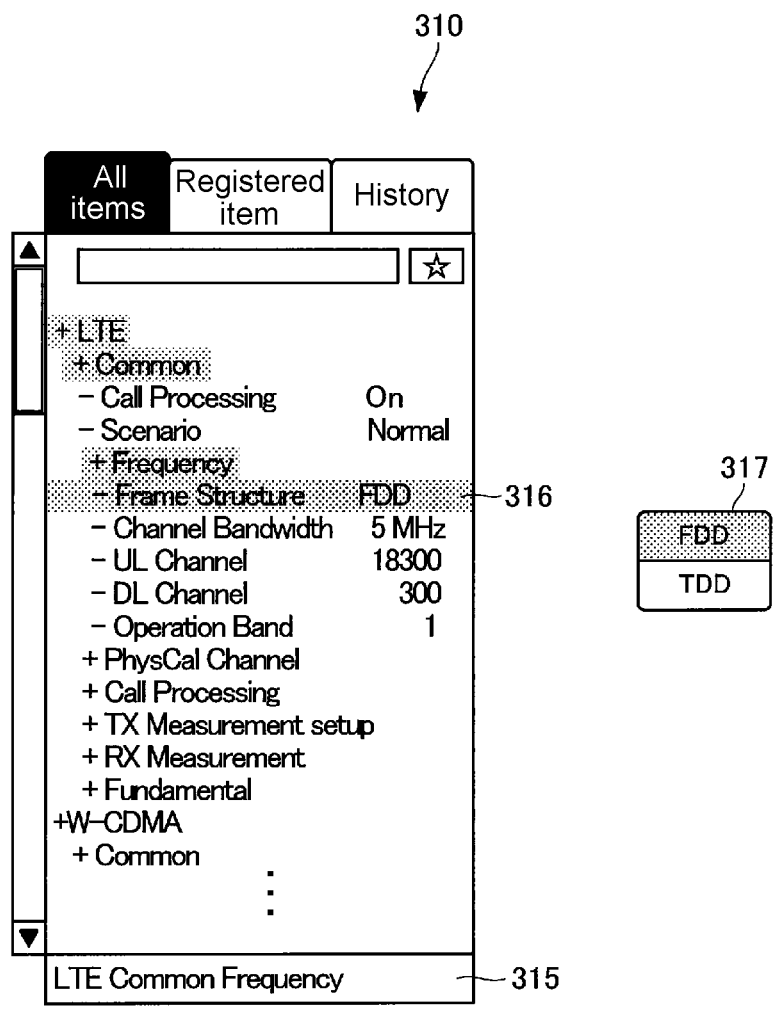
FIG. 5 is a diagram illustrating an example of the display of an all-setting-item display screen in the mobile terminal test apparatus according to the embodiment of the invention.

FIG. 5 shows an example in which the tester taps the display region of "Frame Structure" among the setting items displayed on the all-setting-item display screen 310 and a cursor 316 is displayed in the display region. The setting item "Frame Structure" is a setting item in the lower layer of the small category "Frequency" belonging to the large category "Common" of the communication standard LTE. In this case, the setting input screen control unit displays hierarchical information "LTE Common Frequency" on the hierarchical information display screen 315. As a result, the tester can clearly and instantly know that the setting item which is selected by tapping is the setting item "Frame Structure" belonging to the categories LTE, Common, and Frequency and is not the setting item "Frame Structure" in other communication standards (for example, W-CDMA). The possibility of a wrong setting item being selected is reduced.

In the state shown in FIG. 5, "FDD" is displayed in a test parameter value region of the setting item "Frame Structure" designated by the tester. When the tester taps the "FDD" display region, the setting input screen control unit 34 displays a test value selection window 317 for selecting the test parameter value. "FDD" and "TDD" are displayed in the test value selection window 317 and the test parameter value which is tapped by the tester in the test value selection window 317 is set. For example, the tester can slide the display region of the test value selection window 317 with a finger to arbitrarily set the display position of the test value selection window 317.

The tester can select the test parameter values of the setting items other than the setting item "Frame Structure" using the same window as the test value selection window 317. When the value of a frequency or a voltage is input as the test parameter value, the setting input screen control unit 34 displays, for example, a numerical keypad in the setting item setting area 201.

Next, the operation of the display operation control device 30 controlling the display of the registered item display screen 320 will be described with reference to FIG. 6.

Figure 6:
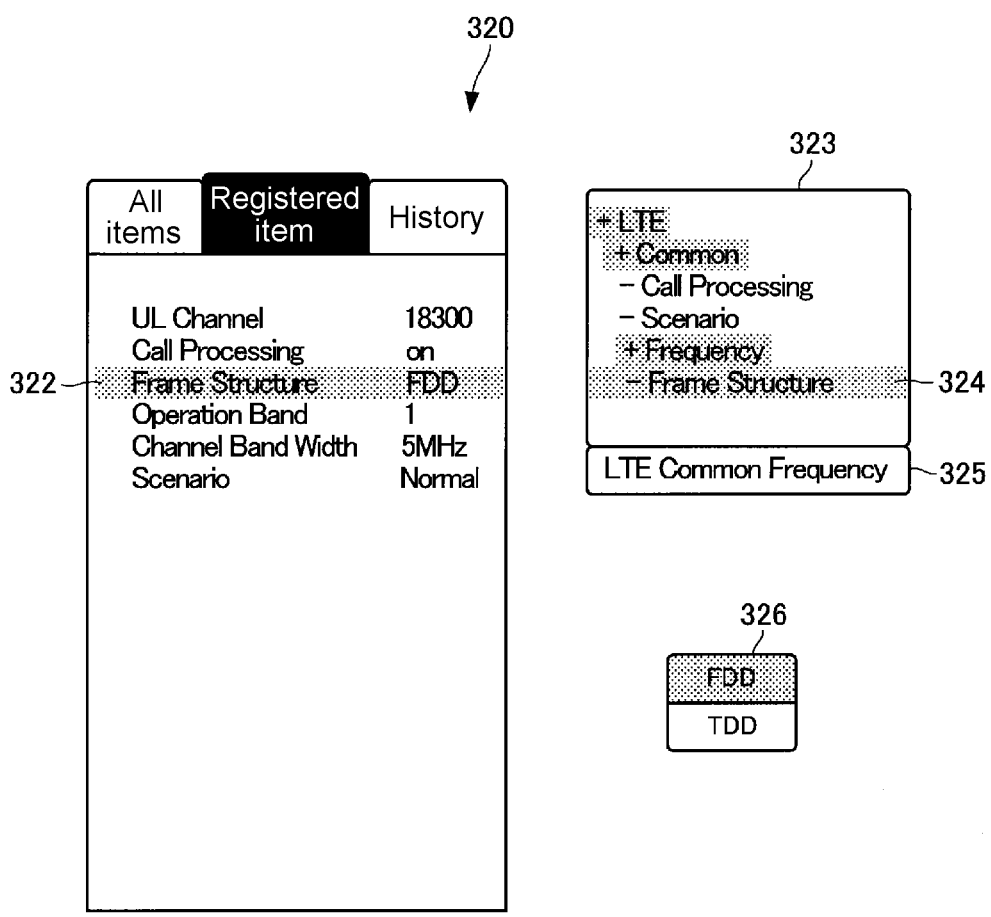
FIG. 6 is a diagram illustrating an example of the display of a registered item display screen in the mobile terminal test apparatus according to the embodiment of the invention.

FIG. 6 shows an example in which the tester taps the display region of "Frame Structure" among the registered items displayed on the registered item display screen 320 and a cursor 322 is displayed in the display region. In this case, the setting input screen control unit 34 displays a hierarchical information display screen 323 which displays the hierarchical information of "Frame Structure" in the all-setting-item display screen 310 (see FIG. 4(a)) in the vicinity of the registered item display screen 320. In the hierarchical information display screen 323, a cursor 324 is displayed at the display position of "Frame Structure". For example, the tester can slide the display region of the hierarchical information display screen 323 with a finger to arbitrarily set the display position of the hierarchical information display screen 323.

A hierarchical information display screen 325 which is the same as the hierarchical information display screen 315 (see FIG. 4(a)) is displayed along with the hierarchical information display screen 323 and hierarchical information is displayed on the hierarchical information display screen 325. As a result, the tester can clearly and instantly know that the designated registered item is the setting item "Frame Structure" belonging to the categories LTE, Common, and Frequency, but is not the setting item "Frame Structure" in other communication standards. Therefore, there is no concern that the tester will select a wrong setting item.

When the tester taps the display region of the test parameter value "FDD" of the setting item "Frame Structure" designated by the tester, a test value selection window 326 is displayed by the setting input screen control unit 34.

The registered item display screen control unit 32 may display the hierarchical information on one of the hierarchical information display screens 323 and 325.

Next, the operation of the display operation control device 30 controlling the display of the history display screen 330 will be described with reference to FIG. 7.

Figure 7:
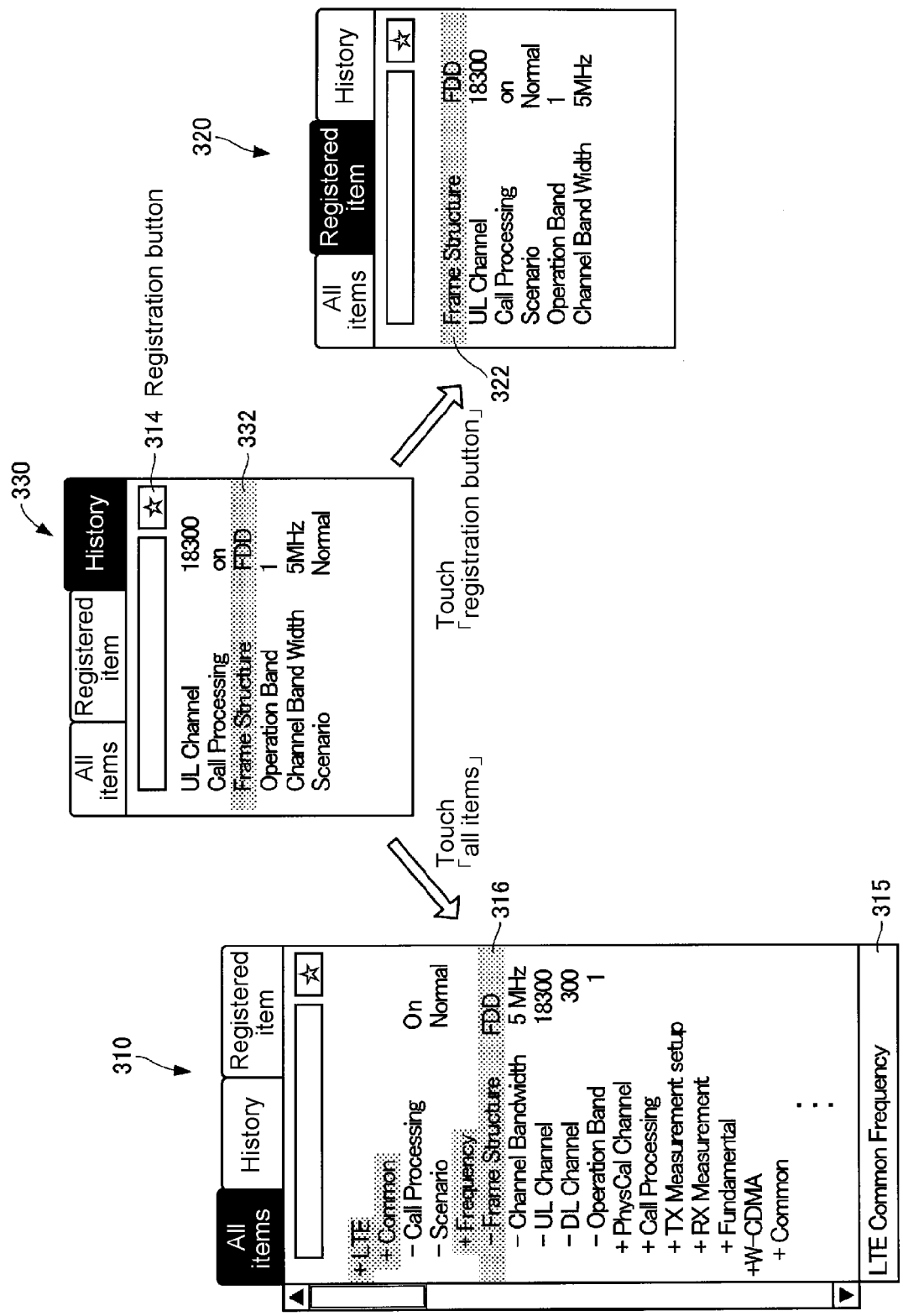
FIG. 7 is a diagram illustrating an example of the display of a history display screen in the mobile terminal test apparatus according to the embodiment of the invention.

An example in which the tester taps the display region of the setting item "Frame Structure" displayed on the history display screen 330 and a cursor 332 is displayed in the display region is shown in the middle of FIG. 7. When the tester taps the all-item tab of the window following the above-mentioned operation, the setting input screen control unit 34 displays the all-setting-item display screen 310 which is shown on the left side of FIG. 7. That is, the setting input screen control unit 34 displays the all-setting-item display screen 310 on which the cursor 316 is displayed in the display region of the setting item "Frame Structure" tapped by the tester and hierarchical information "LTE Common Frequency" on the hierarchical information display screen 315. As a result, the tester can clearly and instantly know that the designated registered item is the setting item "Frame Structure" belonging to the categories LTE, Common, and Frequency, but is not the setting item "Frame Structure" in other communication standards. Therefore, there is no concern that the tester will select a wrong setting item.

When the tester taps the registration button 314 after the cursor 332 is displayed in the display region of the setting item "Frame Structure" displayed on the history display screen 330 following the tapping of the display region, the registered item display screen control unit 32 displays the registered item display screen 320 which is shown on the right side of FIG. 7 and stores the setting item "Frame Structure" tapped by the tester and the hierarchical information thereof in the registered item storage unit 42. The setting item may be registered from the all-setting-item display screen 310.

Next, the functions of the setting item display processing unit 35 for the history display screen 330 will be described with reference to FIG. 8.

Figure 8:
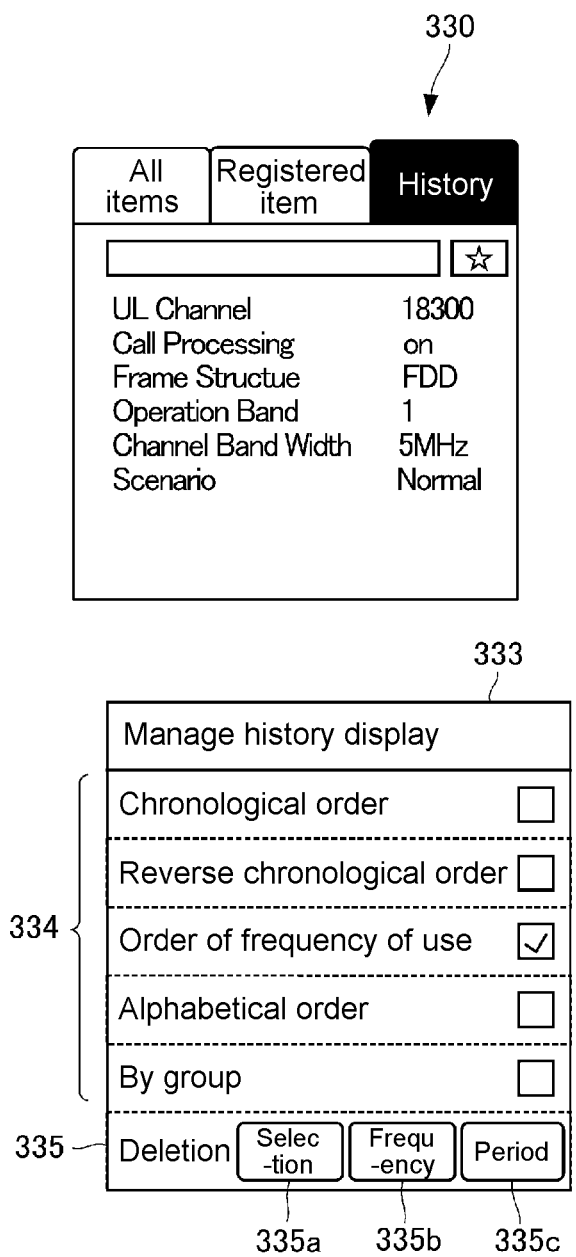
FIG. 8 is a diagram illustrating a history display management window displayed by a setting item display processing unit of the mobile terminal test apparatus according to the embodiment of the invention.

As shown in FIG. 8, the setting item display processing unit 35 displays a history display management window 333 for managing the display of the history. For example, the history display management window 333 is displayed when the tester continuously taps a history tab of the window of the history display screen 330 two times. The history display management window 333 includes a rearrangement condition setting area 334 in which conditions for rearranging the history information are set and a deletion setting area 335 for deleting predetermined history information.

The rearrangement condition setting area 334 is provided with check boxes for selecting, as the conditions for rearranging the history information, a "chronological order" in which the items are displayed from oldest to newest on the basis of the present time, a "reverse chronological order" in which the items are displayed from newest to oldest on the basis of the present time, an "order of frequency of use" in which the item with the highest frequency of use is displayed first, an "alphabetical order" in which capital letters of the setting items are displayed alphabetically, and "by group" in which items are displayed according to each predetermined group (each category). For example, a plurality of rearrangement conditions, such as the "order of frequency of use" and "by group", may be selected at the same time.

In the example shown in FIG. 8, the "order of frequency of use" is selected at the present time. When the "order of frequency of use" is selected, the setting item which is more frequently used by the tester is disposed at the higher position of the history display screen 330 and it is easy for the tester to set the setting items. When the "chronological order", the "reverse chronological order", and the "alphabetical order" are selected, it is easy for the tester to manage the setting items on, for example, the history display screen 330. When "by group" is selected, the tester can easily and accurately select, for example, the setting item which is used only as a pseudo-base station.

For example, displaying the items by group means that a group of the setting items related to an uplink and a group of the setting items related to a downlink are predetermined, the tester selects each group, and the selected group is displayed.

For example, a selection button 335a, a frequency button 335b, and a period button 335c are displayed in the deletion setting area 335.

The setting item display processing unit 35 is programmed so as to select and delete arbitrary history information desired by the tester when the tester taps the selection button 335a.

The setting item display processing unit 35 is programmed so as to delete the history information of the setting item which has been set an arbitrary number of times or less among the setting items which were set in the past when the tester taps the frequency button 335b.

The setting item display processing unit 35 is programmed so as to delete the history information of the setting item which has been set for an arbitrary period (for example, before three months) among the setting items which were set in the past when the tester taps the period button 335c.

The setting item display processing unit 35 is programmed so as to delete the history information from the history storage unit 43 of the setting management device 40 when the tester uses the selection button 335a, the frequency button 335b, and the period button 335c to input an instruction to delete the history information.

As described above, the setting item display processing unit 35 performs a process of rearranging the setting items or a process of deleting a predetermined setting item in response to instructions from the tester to customize the display of the setting items to display corresponding to the preference of the tester. Therefore, the tester can set the setting items more easily and more accurately than in the structure in which the setting items are simply arranged. As a result, the possibility that a setting error will occur is reduced.

For example, when the tester taps the display region of the setting item "Frame Structure" displayed on the history display screen 330, one of the hierarchical information display screens 323 and 325 is displayed, similarly to FIG. 6. In addition, similarly to FIG. 6, for example, when the tester taps the display region of the test parameter value "FDD" of the setting item "Frame Structure", the setting input screen control unit 34 displays the test value selection window 326. In addition, in the display of the registered item display screen 320 shown in FIG. 6, similarly to FIG. 8, a registered item display management screen for managing the registered item can be displayed and the registered item can be managed.

Figure 9:
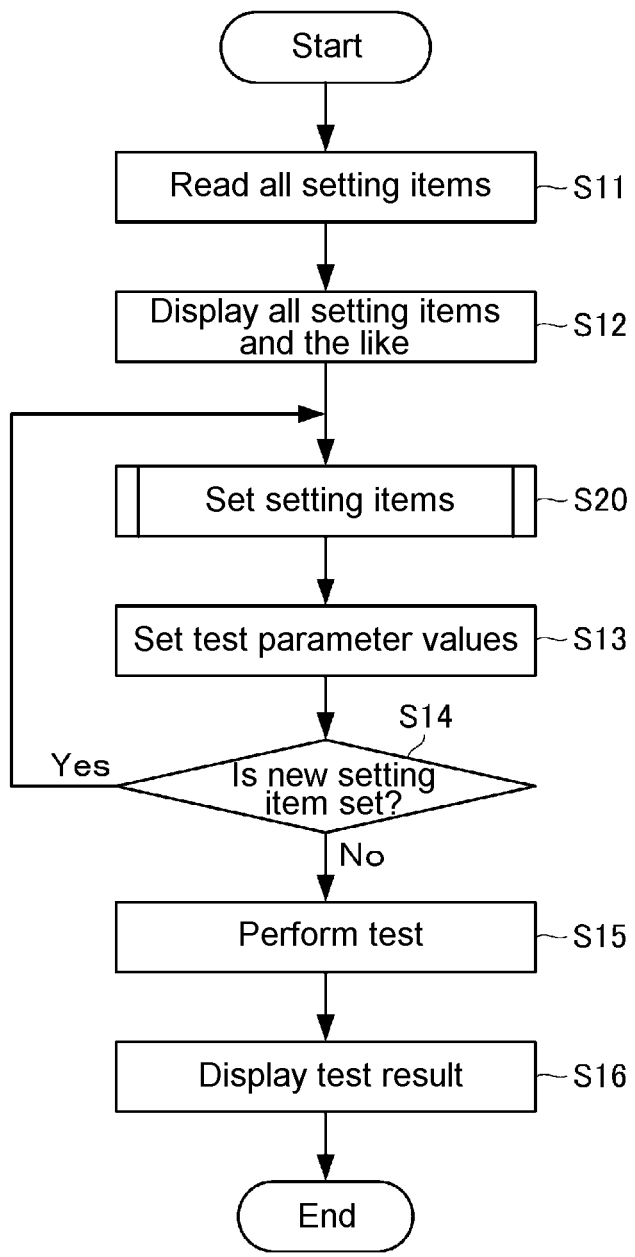
FIG. 9 is a flowchart illustrating the operation of the mobile terminal test apparatus according to the embodiment of the invention.

Next, the operation of the mobile terminal test apparatus 10 according to this embodiment will be described with reference to the flowchart shown in FIG. 9.

The all-setting-item display screen control unit 31, the registered item display screen control unit 32, and the history display screen control unit 33 (hereinafter, referred to as "the all-setting-item display screen control unit 31 and the like") of the display operation control device 30 each read data for all setting items, the registered items, and the history (hereinafter, referred to as "all setting items and the like") from the all-setting-item storage unit 41, the registered item storage unit 42, and the history storage unit 43 of the setting management device 40 (Step S11).

The all-setting-item display screen control unit 31 and the like display all setting items and the like in the setting item setting area 201 of the display unit 22 of the touch panel 20 (Step S12). For example, the all-setting-item display screen control unit 31 displays the all-setting-item display screen 310 shown in FIG. 4(a) in the setting item setting area 201. When the tester taps the history tab on the all-setting-item display screen 310, the history display screen control unit 33 displays the history display screen 330 in the setting item setting area 201.

When the operation unit 21 of the touch panel 20 detects the touch operation of the tester, the setting item is set (Step S20). This will be described in detail below.

The setting input screen control unit 34 of the display operation control device 30 sets the test parameter values in response to the touch operation of the tester with the touch panel 20 (Step S13).

The setting input screen control unit 34 determines whether a new setting item is set (Step S14). For example, when the tester newly taps a setting item display area, the setting input screen control unit 34 determines that there is a new setting item and returns to Step S10. On the other hand, for example, when the tester taps the test execution button 201c shown in FIG. 2, the setting input screen control unit 34 determines that there is no new setting item and directs the test execution device 50 to test UE1 on the basis of the setting information (Step S15).

Specifically, when the test execution button 201c is tapped, the setting input screen control unit 34 transmits a setting end signal indicating that the input of the setting information has ended to the test control unit 51. The test control unit 51 acquires the setting information from the setting information storage unit 44 of the setting management device 40, directs the signal generating unit 52 to generate the test signal based on the setting information, and tests UE1.

When the test ends, the test execution device 50 outputs data for the test result analyzed by the signal analysis unit 53 to the display operation control device 30. The test result screen control unit 36 displays the test result in the test result display area 202 of the display unit 22 of the touch panel 20 (Step S16).

Figure 10:
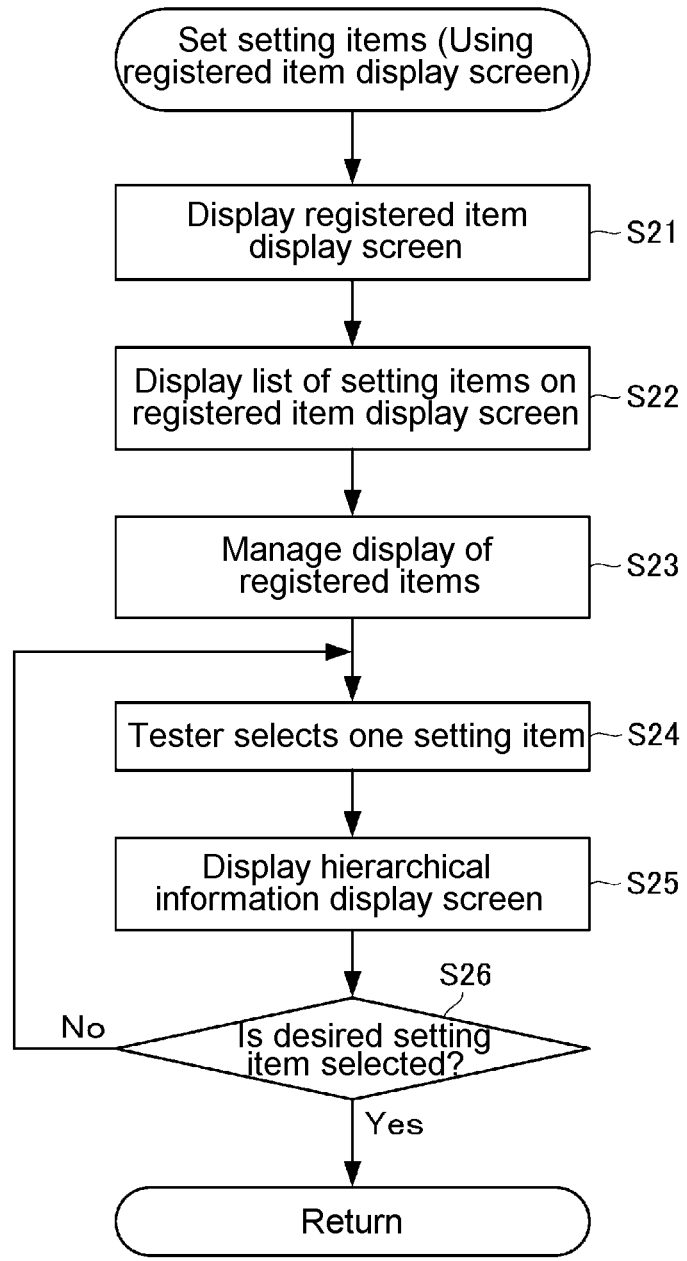
FIG. 10 is a flowchart illustrating an example of a process of setting the setting items using the registered item display screen in the mobile terminal test apparatus according to the embodiment of the invention.

The setting item setting process (Step S20) shown in FIG. 9 will be described with reference to the flowchart shown in FIG. 10, using an example in which the tester sets the setting items using the registered item display screen 320 (see FIG. 4(b)).

When the registered item display screen control unit 32 displays the registered item display screen 320 in the setting item setting area 201 (Step S21), a list of the setting items is displayed on the registered item display screen 320 (Step S22). For example, when the all-setting-item display screen 310 is displayed in the setting item setting area 201 and the tester taps the registration tab, the registered item display screen control unit 32 displays the registered item display screen 320 in the setting item setting area 201.

Similarly to the history display and management on the history display screen 330 shown in FIG. 8, the registered item display management screen for managing the display of the registered items is displayed and the tester can manage the display of the registered items (Step S23). That is, the tester can perform, for example, an operation of rearranging the registered item under the desired conditions or an operation of deleting the registered items. Step S23 is arbitrarily performed by the tester. In some cases, Step S23 is omitted.

When the tester taps the display region of one of the setting items, one setting item is selected (Step S24). The setting input screen control unit 34 acquires the information of the selected setting item and displays the hierarchical information display screen in the vicinity of the registered item display screen 320 (Step S25). For example, as shown in FIG. 6, when the tester selects "Frame Structure", the cursor 322 is displayed at the corresponding position and the hierarchical information of the setting item "Frame Structure" selected by the tester is displayed by the hierarchical information display screen 323 and the hierarchical information display screen 325.

The setting input screen control unit 34 determines whether the selected setting item is the setting item desired by the tester (Step S26). For example, when the tester taps the decision button 201a shown in FIG. 2, the setting input screen control unit 34 determines that the selected setting item is the setting item desired by the tester and returns to the main flow. On the other hand, for example, when the tester taps the cancel button 201b shown in FIG. 2, the setting input screen control unit 34 determines that selected setting item is not the setting item desired by the tester and returns to Step S24.

Figure 11:
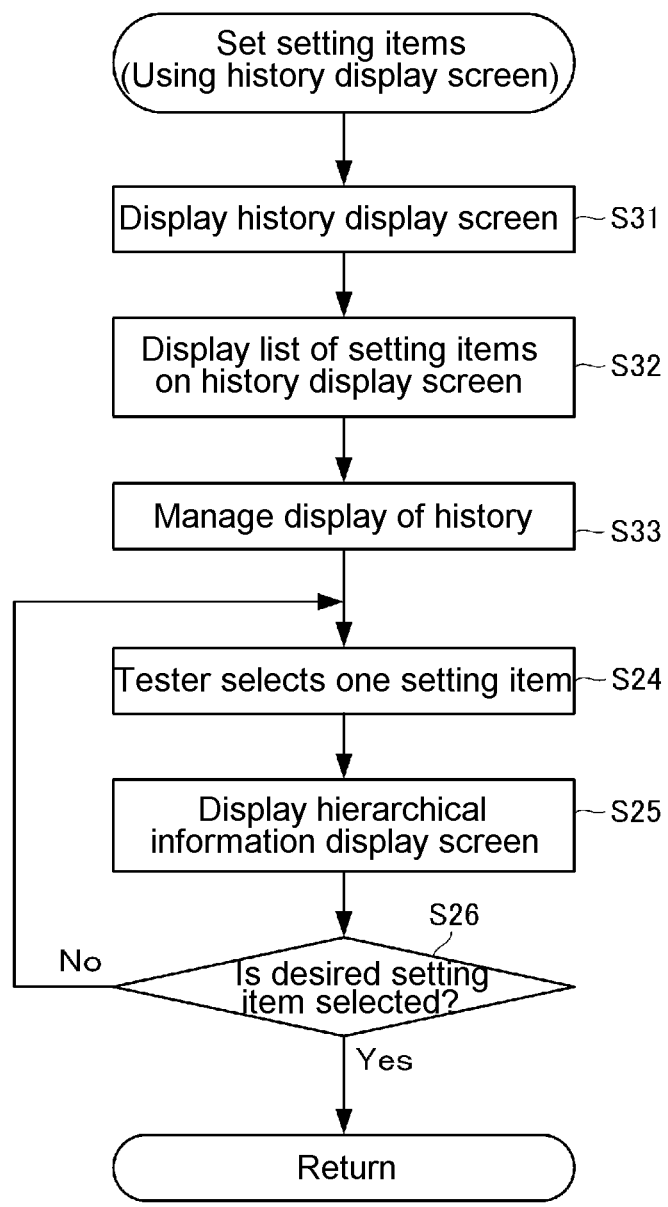
FIG. 11 is a flowchart illustrating an example of a process of setting the setting items using the history display screen in the mobile terminal test apparatus according to the embodiment of the invention.

Next, the setting item setting process (Step S20) shown in FIG. 9 will be described with reference to the flowchart shown in FIG. 11, using an example in which the tester sets the setting items using the history display screen 330 (see FIG. 4(c)). Steps S24 to S26 are the same as those in FIG. 10 and the description thereof will not be repeated.

When the history display screen control unit 33 displays the history display screen 330 in the setting item setting area 201 (Step S31), a list of the setting items is displayed on the history display screen 330 (Step S32). For example, when the all-setting-item display screen 310 is displayed in the setting item setting area 201 and the tester taps the history tab, the history display screen control unit 33 displays the history display screen 330 in the setting item setting area 201.

As shown in FIG. 8, the history display management window 333 for managing the display of the history is displayed and the tester can manage the display of the history (Step S33). That is, the tester can perform, for example, an operation of rearranging the history under the desired conditions or an operation of deleting an arbitrary history. Step S33 is arbitrarily performed by the tester. In some cases, Step S33 is omitted.

As such, in the mobile terminal test apparatus 10 according to this embodiment, the setting item display processing unit 35 performs at least one of the process related to the display order of the setting items which are displayed by at least one of the registered item display screen control unit 32 and the history display screen control unit 33 and the process related to the deletion of the setting items in response to instructions from the tester. Therefore, the display of the setting items is customized to display corresponding to the preference to the tester.

Therefore, the tester can set the setting items more easily and more accurately than in the structure in which the setting items are simply arranged, and the possibility that a setting error will occur is reduced. As a result, the mobile terminal test apparatus 10 according to this embodiment can set the setting items more easily and more accurately than in the related art and test the mobile terminal.

In the mobile terminal test apparatus 10 according to this embodiment, the setting input screen control unit 34 displays the hierarchical information on condition that the setting item displayed by any one of the all-setting-item display screen control unit 31, the registered item display screen control unit 32, and the history display screen control unit 33 is selected. Therefore, the possibility that a setting error will occur is reduced and it is possible to set the setting items more easily and more accurately than in the related art and test the mobile terminal.

INDUSTRIAL APPLICABILITY

As described above, the mobile terminal test apparatus according to the invention can set the setting items more easily and more accurately than in the related art and test the mobile terminal. The invention is useful as a mobile terminal test apparatus and a mobile terminal test method for testing mobile terminals.

DESCRIPTION OF REFERENCE NUMERALS AND SIGNS

1: UE (Mobile terminal)
10: Mobile terminal test apparatus
20: Touch panel
21: Operation unit
22: Display unit
30: Display operation control device
31: All-setting-item display screen control unit (All-setting-item display means)
32: Registered item display screen control unit (Registered item display means, Specific item display means)
33: History display screen control unit (History display means, Specific item display means)
34: Setting input screen control unit (Hierarchical information display means)
35: Setting item display processing unit (Setting item display processing means)
36: Test result screen control unit
40: Setting management device
41: All-setting-item storage unit (All-setting-item storage means)
42: Registered item storage unit
43: History storage unit
44: Setting information storage unit
50: Test execution device
51: Test control unit (Test execution means)
52: Signal generating unit
53: Signal analysis unit
54: Coupler

What is claimed is:

1. A mobile terminal test apparatus that outputs a predetermined test signal to a mobile terminal to test the mobile terminal, comprising:
   first display means for displaying setting items used to test the mobile terminal;
   second display means for displaying specific setting items, the specific setting items being selected from among all of the setting items; and
   processing means for performing a process related to a display order of the specific setting items displayed by the second display means, a process related to the deletion of specific setting items displayed by the second display means, or a combination thereof, in response to an instruction from the tester; and
   test execution means for performing a test of a mobile terminal based on a setting item selected by a tester among the setting items displayed by the first display means and for performing a test of a mobile terminal based on a specific setting item selected by the tester among the specific setting items displayed by the second display means.

2. The mobile terminal test apparatus according to claim 1,
   wherein the processing means rearranges the display order of the specific setting items displayed by the second display means on the basis of the frequency of use of the setting items which have been used in the past by the tester.

3. The mobile terminal test apparatus according to claim 1,
   wherein the processing means rearranges the display order of the specific setting items displayed by the second display means on the basis of a selection time indicating a time when the setting item which has been used in the past by the tester has been selected.

4. The mobile terminal test apparatus according to claim 1,
   wherein the processing means rearranges the display order of the specific setting items displayed by the second display means for each of a predetermined setting item groups.

5. The mobile terminal test apparatus according to claim 1,
   wherein the processing means deletes a setting item designated by the tester among the specific setting items displayed by the second display means.

6. The mobile terminal test apparatus according to claim 1, further comprising:
   third display means; and
   storage means for hierarchically storing all of the setting items, wherein the third display means displays hierarchical information indicating a hierarchical structure of the specific setting item selected by the tester on the basis of the content of the setting items stored in the storage means, on condition that the specific setting item displayed by the second display means is selected.

7. The mobile terminal test apparatus according to claim 1, further comprising:
storage means for storing a history of the setting items that have been selected in the past,
wherein the second display means displays the setting items stored in the storage means.

8. The mobile terminal test apparatus according to claim 1, further comprising:
storage means for storing setting items registered by the tester,
wherein the second display means displays the setting items stored in the registered item storage means.

9. The mobile terminal test apparatus according to claim 1,
wherein the first display means, the second display means, and the processing means are formed by a computer including a CPU, a RAM, an output interface, and a program executed by the computer.

10. The mobile terminal test apparatus according to claim 1, wherein the setting items are test parameters of the test performed of the mobile terminal, and the specific setting items are a subset of the test parameters.

11. A mobile terminal test method that tests a mobile terminal using a mobile terminal test apparatus which outputs a predetermined test signal to the mobile terminal to test the mobile terminal, comprising:
displaying setting items used to test the mobile terminal;
performing a test of the mobile terminal related to a setting item selected by a tester;
displaying specific setting items, the specific setting items being selected from among all of the setting items; and
performing a process related to a display order of the displayed specific setting items, a process related to the deletion of the displayed specific setting items, or a combination thereof, in response to an instruction from the tester,
wherein the setting item selected by the tester is a setting item among the displayed specific setting items.

12. The mobile terminal test method according to claim 11,
wherein the performed process rearranges the display order of the displayed specific setting items on the basis of the frequency of use of the setting items which have been used in the past by the tester.

13. The mobile terminal test method according to claim 11,
wherein the performed process rearranges the display order of the displayed specific setting items on the basis of a selection time indicating a time when the setting item which has been used in the past by the tester has been selected.

14. The mobile terminal test method according to claim 11,
wherein the performed process rearranges the display order of the displayed specific setting items for each of a predetermined setting item groups.

15. The mobile terminal test method according to claim 11,
wherein the performed process deletes a setting item designated by the tester among the displayed specific setting items.

16. The mobile terminal test method according to claim 11, further comprising:
hierarchically displaying all of the setting items, and
displaying hierarchical information indicating a hierarchical structure of the selected setting item on the basis of content of stored setting items, on condition that the selected setting item is a displayed specific setting item.

17. The mobile terminal test method according to claim 11,
wherein the mobile terminal test apparatus includes storage means for storing a history of the setting items that have been selected in the past, and
the displayed specific setting items are selected from the setting items stored in the history storage means.

18. The mobile terminal test method according to claim 11,
wherein the mobile terminal test apparatus includes storage means for storing setting items registered by the tester, and
the displayed specific setting items are selected from the setting items stored in the registered item storage means.

19. The mobile terminal test method according to claim 11,
wherein the displaying steps and the step of performing a process are implemented by a computer including a CPU, a RAM, an output interface, and a program executed by the computer.

20. The mobile terminal test method according to claim 11, wherein the setting items are test parameters of the test performed of the mobile terminal, and the specific setting items are a subset of the test parameters.

* * * * *